Feb. 22, 1955 E. H. REPLOGLE 2,702,677
AIRCRAFT EJECTION SEAT
Filed June 12, 1952 4 Sheets-Sheet 2
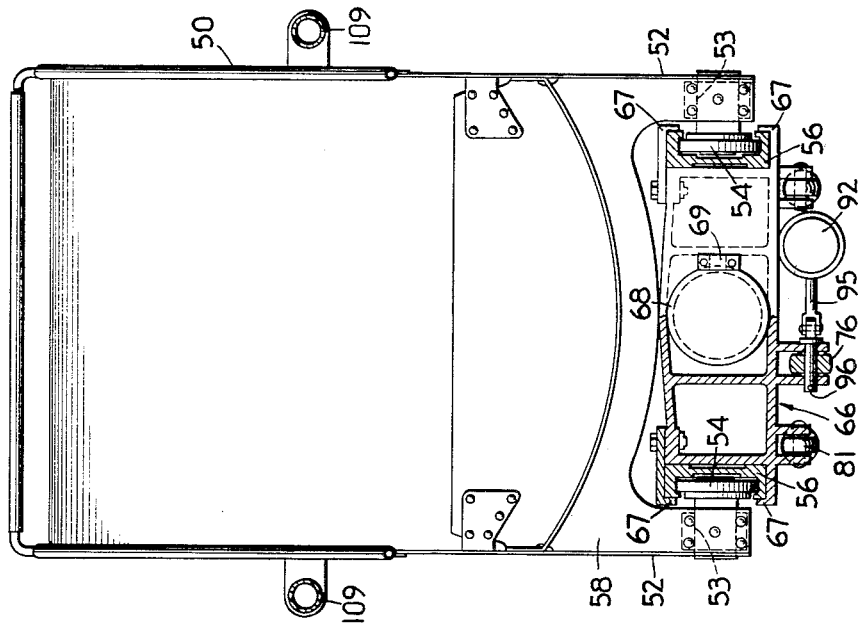
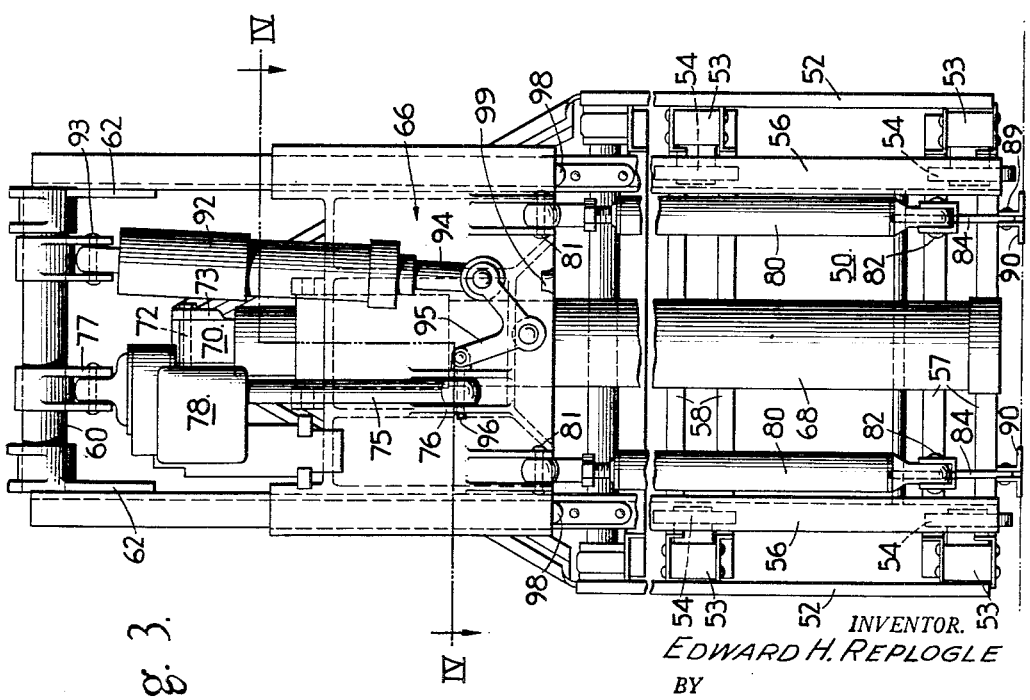
INVENTOR.
EDWARD H. REPLOGLE
BY
Bean, Brooks, Buckley & Bean
ATTORNEYS Feb. 22, 1955     E. H. REPLOGLE     2,702,677
AIRCRAFT EJECTION SEAT
Filed June 12, 1952     4 Sheets-Sheet 3

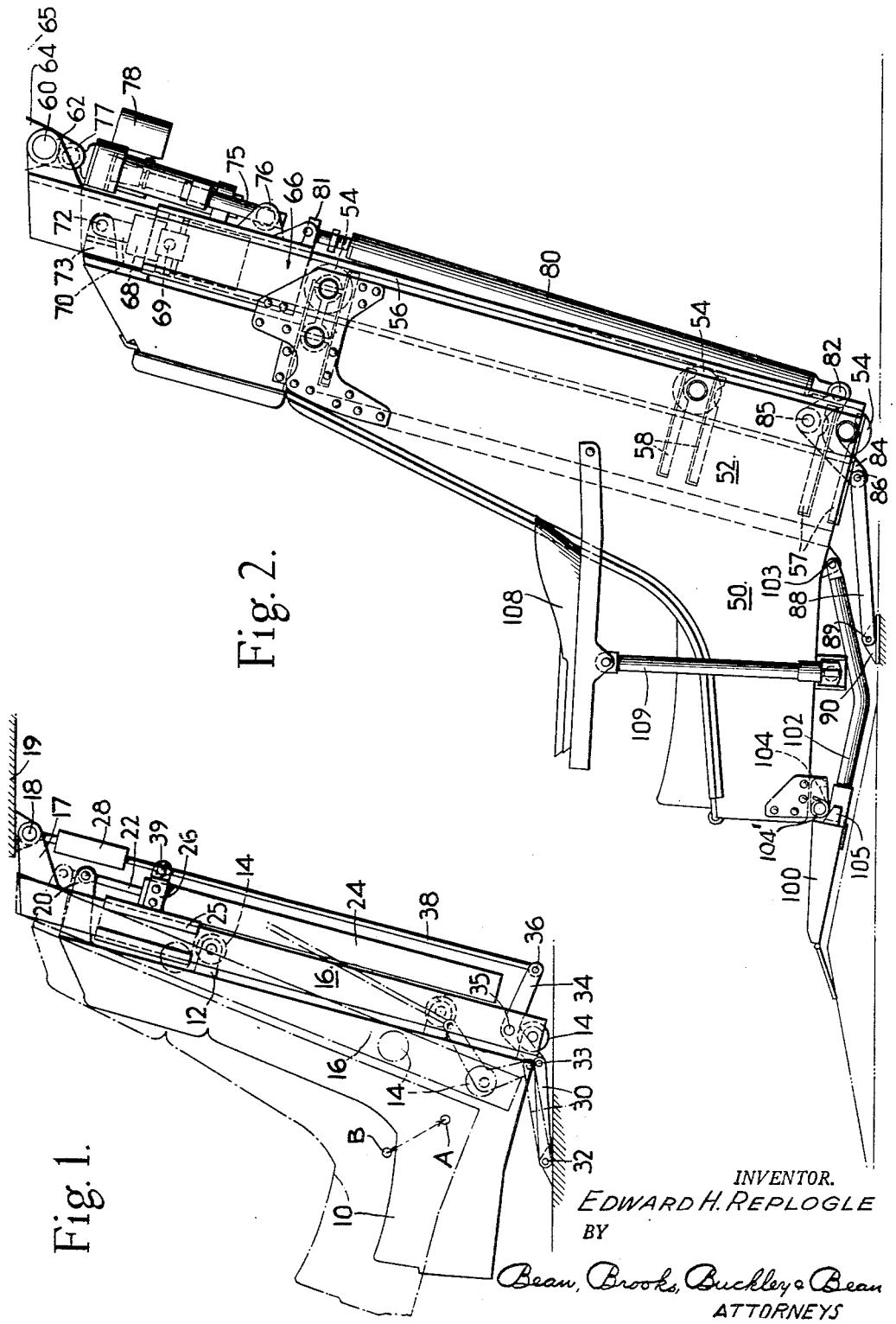

INVENTOR.
EDWARD H. REPLOGLE
BY
Bean, Brooks, Buckley & Bean.
ATTORNEYS

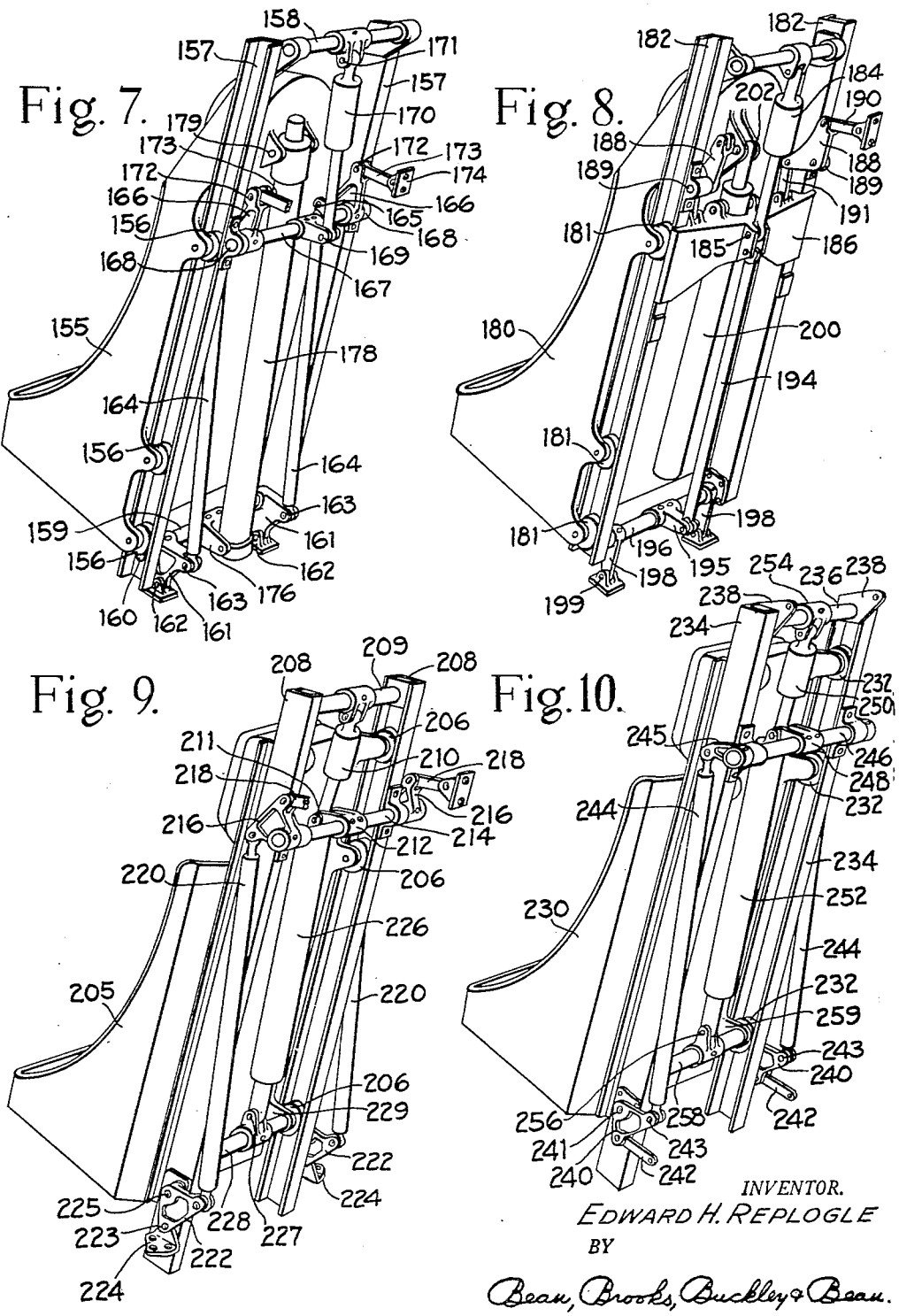

United States Patent Office 2,702,677
Patented Feb. 22, 1955

2,702,677

AIRCRAFT EJECTION SEAT

Edward H. Replogle, Snyder, N. Y., assignor to Stanley Aviation Corporation, Buffalo, N. Y.

Application June 12, 1952, Serial No. 293,111

14 Claims. (Cl. 244—122)

This invention relates to crewman seats for aircraft, and more particularly to seats which are adapted to be jettisoned in either upward or downward directions from the aircraft in emergencies, and which are normally adjustable both vertically and in fore-and-aft directions to suit the seat to variously sized crewmen.

It has been determined that a pilot's seat which adjusts in an upwardly inclined and substantially straight line path having about three inches of forward movement for each five inches of upward movement most nearly fulfills a military aircraft standardized requirement for accommodation of variously sized aircraft personnel. Unfortunately, it is not practicable to mount a seat for ejection on slide rails having the aforesaid inclination whereby a simple slide system could be used for both anthropometric adjustments and emergency ejection of the seat. Such a method would result in ejection of the seat and crewman in a direction substantially normal to the line of the crewman's body when in normal seated attitude; whereas the best direction for high acceleration ejection of crewmen, as from a high speed airlane, is in line with the crewman's torso.

Thus, it will be appreciated that in a seat designed for both anthropometric adjustments and upward or downward emergency ejections, provisions must be made for independent motions of the seat in non-parallel paths. As a consequence, prior ejection seat designs have usually employed separate seat and ejection carriage units; the ejection carriage unit being movable along a fixed up or down slideway or the like for emergency ejection purposes while the seat is movable both vertically and in fore-and-aft directions relative to the ejection carriage to permit adjustments for differently sized crewmen. Such mechanisms of the prior art therefore involve the use of ejection carriage structures which are of necessity quite heavy in order to embody sufficient strength to provide adequate normal support for the seat and to withstand the high acceleration loadings required to insure that the seat and occupant will be ejected clear of all parts of the airplane, especially in connection with modern high speed aircraft.

When it is understood that the principal reason for providing a forward component of seat adjustment incidental to vertical adjustment thereof is to compensate for the different leg lengths of various crewmen while at the same time keeping the eye level substantially constant without need or desire for relocation of the fore-and-aft position of the eye, it will be appreciated that the prerequisites for a structurally simplified and reduced weight ejection seat design may be satisfactorily met through use of a fore-and-aft adjustable ejection track upon which the seat is vertically movable for both anthropometric adjustment and emergency ejection purposes. Furthermore, it will be appreciated that in order to maintain the pilot's seat within convenient reach of the rudder pedals and the eye at a substantially constant elevation and fore-and-aft position, the ejection track unit need not be bodily movable in fore-and-aft directions relative to the aircraft, but may be pivotally mounted thereon such as for example adjacent its upper end. Such an arrangement provides the still further advantage that the ejection track unit may be "aimed" at a fuselage opening of minimum size which will accommodate passage of the jettisoning body and seat and accessories, regardless of the anthropometric adjustment position of the seat.

An object of the present invention is to provide an improved aircraft crewman seat embodying the features and advantages aforesaid.

Another object of the invention is to provide an improved aircraft crewman seat of the ejectable type which is of improved strength and adapted for satisfactory high speed ejection operation, while being at the same time of decreased weight compared to anthropometrically adjustable ejection seat arrangements of the prior art.

Another object of the invention is to provide an improved aircraft crewman seat of the ejectable type which incorporates mechanism permitting up and forward and down and back diagonal adjustments of the seat without the use of an intermediate structure between the seat and the ejection track device, thereby attaining substantial weight reduction and mechanical simplification.

Another object of the invention is to provide an improved aircraft seat embodying a movable ejection rail structure upon which is mounted a vertically movable seat; the aforesaid devices being interconnected by linkage means operable to produce automatically vertical adjusting movements of the seat synchronized with fore and aft substantially parallel motion of the rail structure, resulting in diagonal adjustments of the seat.

Another object of the invention is to provide an improved aircraft crewman seat of the ejectable type, embodying a pivotally suspended ejection rail structure upon which is amounted a vertically movable seat; the aforesaid devices being interconnected by linkage operable to procure automatically vertical adjusting movements of the seat synchronized with pivoting movements of the rail structure.

Another object of the invention is to provide a seat arrangement as aforesaid wherein the seat is at all times readily ejectable from the aircraft along the rail structure without requiring preliminary return of the seat to any prescribed "base" position on the rail structure.

Still another object of the invention is to provide an improved seat design as aforesaid embodying a novel seat mounting and ejection guide connection and seat adjustment control mechanism.

Other objects and advantages of the invention will appear from the specification hereinafter.

In the drawings:

Fig. 1 is a side elevation of an upward ejection seat of the invention wherein the ejection rail structure pivotally connects adjacent its upper end to the aircraft frame; showing the seat in two different positions for pilot accommodation;

Fig. 2 is a side elevation of a more detailed seat design embodying the principles of the arrangement of Fig. 1;

Fig. 3 is a rear elevation of the seat construction of Fig. 2;

Fig. 4 is a section taken along line IV—IV of Fig. 3.

Fig. 7 is a view similar to Fig. 5 but of a modified form of the invention wherein the ejection rail unit is mounted upon parallel crank devices relative to the aircraft frame;

Fig. 8 illustrates a construction similar to Fig. 7, but using a different ejection catapult device;

Fig. 9 illustrates the invention applied to a downward ejection seat arrangement having the ejection rail unit thereof mounted for parallel motion as in Fig. 7; and Fig. 10 illustrates a downward ejection seat arrangement wherein the ejection rail unit pivots adjacent its upper end.

Figure 5:
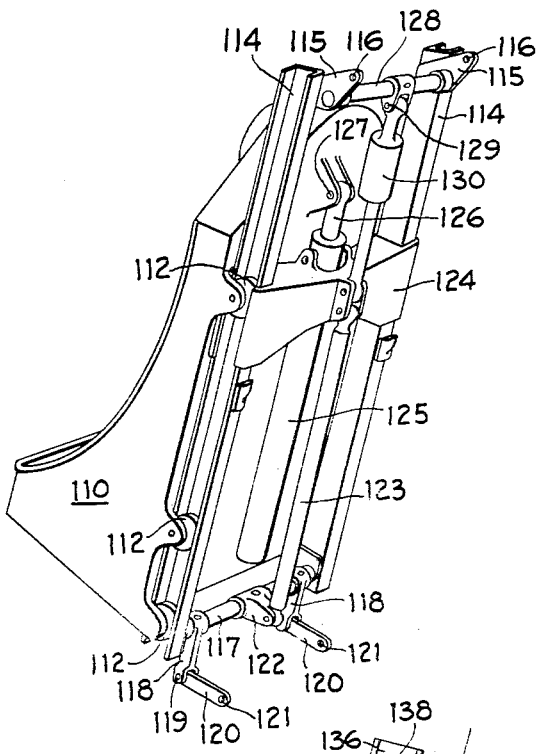
Fig. 5 is a rear perspective view of a seat arrangement similar to that of Fig. 1.

As illustrated in Fig. 1, a seat arrangement of the invention may be constructed to comprise a seat bucket 10 having brackets 12 extending rearwardly therefrom and mounting rollers 14 which are disposed to run in a rail structure 16. The rail structure 16 is pivotally suspended as by means of bracket 17 and pivot connection 18 to a fixed structural portion of an aircraft as indicated at 19. Thus, the rail unit is suspended by the pivot 18 for fore-and-aft swinging movements of the lower end of the unit, whereby the lower portion of the seat will be similarly swung in fore-and-aft directions while the upper end of the seat will receive no substantial displacements in fore-and-aft directions.

To control the vertical position of the seat bucket 10 in the rail unit 16 I provide integrally with the seat back a suspension horn 20 to which pivotally connects to one end of the thrust member 22 of any suitable seat catapult device; the casing portion 24 of the catapult being fixed to a cross head member 25 as by means of a bracket 26. The cross head 25 slidably engages the rail structure 16 so that the cross head and catapult and seat unit is vertically slidable upon the rail structure 16. Any suitable control means for regulation of the position of the unit relative to the rail structure may be used such as a jack 28 which may be of any suitable type, as for example an electric motor driven telescopic screw device connected at one end to the fixed structure 19 and at its other end to the bracket 26. Thus, it will be appreciated that operation of the jack 28 to either increase or decrease the length thereof will act to either lower or raise the seat bucket 10 on the slide rail structure 16.

To control the fore-and-aft position of the lower end portion of the rail and seat unit, I provide a link 30 to be pivotally connected as indicated at 32 to a fixed floor portion or the like of the aircraft, and to be pivotally connected at its other end as indicated at 33 to one arm of a bell crank 34 which in turn is pivotally mounted as indicated at 35 upon the rail unit 16. The other arm of the bell crank 34 is pivotally connected as indicated at 36 to one end of a push-pull rod 38 which in turn connects as indicated at 39 to the cross head bracket 26. Thus, it will be appreciated that lengthening or shortening of the jack device 28 will procure a corresponding lowering or lifting of the push-pull rod 38, with corresponding rotation of the bell crank 34. Inasmuch as the bell crank 34 is fulcrumed upon the link 30, rotation of the bell crank causes the lower end of the rail unit to swing about the axis of the pivot 18, as from the solid line to the broken line position thereof as indicated in Fig. 1. Thus, operation of the jack 28 in one direction acts to simultaneously raise the seat and to swing the lower end thereof forwardly; while reverse operation of he jack acts to lower the seat and to swing the lower end thereof rearwardly. Hence, it will be appreciated that manual control of the jack through any suitable mechanism (not shown) will cause the seat to be positionally adjusted to suit differently sized crewmen for maximum comfort and operational efficiency. For example, when the seat is "bottomed" as in the solid line position thereof of Fig. 1, the crewman's body position reference point may be as designated at "A," while when the seat is moved to its maximum adjusted position upwardly and forwardly the same reference point would be located as at "B" and the line of travel thereof will be in a diagonal but substantially straight line.

Emergency jettisoning of the seat of Fig. 1 and its occupant will be effected upon actuation of the catapult device 24; it being understood of course that any suitable high acceleration thrust developing device may be employed for this purpose, such as for example the presently standard powder burning type catapult In any case upon manual operation of the catapult control (not shown) the thrust rod 22 will act to project the seat and its occupant upwardly, as guided by the action of the rollers 14 in the rails 16 and through an appropriate opening in the top of the aircraft body. It is to be particularly noted that the pivotal suspension arrangement of the rail unit 16 operates under all conditions to direct the catapulting movement of the seat toward the same ceiling position in the aircraft body irrespective of the adjusted position of the seat relative to the ejection rail structure; and that this mode of seat ejection pertains whether or not the catapult force operates to rupture the jack mechanism 28 with consequent "bottoming" of the said unit. Consequently, the jettison hatch through the aircraft body may be of minimum size.

Figs. 2-4 illustrate a more detailed seat design embodying the form of the invention shown in Fig. 1, wherein a standard type aircraft seat bucket 50 is fitted with rearwardly extending panels 52—52 at the opposite sides thereof; said side panels carrying mounting brackets 53 and rollers 54 running in corresponding C-sectioned rails 56—56. Bottom plates 57—57 and intermediate shelf plates 58—58 span between the side panels 52—52 and provide supports for the roller shafts. A top cross bar 60 connects at its opposite ends to the rails 56—56 by means of brackets 62—62. The top cross bar 60 is journaled in bearing brackets 64—64 which are fixed to the aircraft frame structure as indicated at 65 (Fig. 2). A seat mounting crosshead is illustrated at 66 as being fabricated in the form of a light metal casting having opposite side flange portions 67 embracing the rails 56—56, whereby the crosshead 66 is vertically slidable upon the rail structure. The crosshead 66 is centrally apertured to accommodate therethrough the cylinder portion 68 of a standard catapult mechanism; the cylinder 68 being locked to the crosshead 66 as indicated at 69. The thrust element 70 of the catapult device is coupled by means of a clevis connection 72 to a horn structure 73 extending rearwardly from the top edge of the seat structure 50; and thus it will be appreciated that with the catapult thrust arm 70 in its normal bottomed position the vertical position of the crosshead 66 on the rail unit 56—56 will determine the vertical position of the seat bucket 50 relative to the aircraft structure.

The vertical position of the crosshead 66 on the ejection rail structure 56—56 arranged to be controlled by means of a length-adjustable jack device 75 which pivotally connects at one end by means of a clevis bracket connection 76 to the crosshead 66, and at its other end by means of a clevis bracket 77 to the top cross bar 60. The jack 75 is illustrated as being of the screw type driven by a geared electric motor 78 although any other suitable type may of course be employed. Thus, energization of the jack motor 78 (by any suitable manual control means, not shown) will cause the jack 75 to operate to either raise or lower the seat bucket 50 on the rail unit 56—56.

As indicated at 80—80, push-pull members are pivotally connected at their top ends to opposite side portions of the crosshead 66, as by means of pivot connections 81—81, and at their bottom ends by means of pivot connection devices 82—82 to corresponding arm portions of corresponding bell cranks 84—84. The bell cranks 84—84 are fulcrumed as indicated at 85 (Fig. 2) upon the corresponding side rails 56—56, and are pivotally connected at their other ends as indicated at 86—86 to thrust links 88—88 which in turn pivotally connect as indicated at 89 to brackets 90—90 which are fixed to the aircraft floor structure. Thus, it will be appreciated that upon actuation of the screw jack 75 in such manner as to extend the latter the crosshead 66 will be thereby lowered with consequent lowering of the seat bucket 50 on the ejection rails 56—56. At the same time the bell cranks 84—84 are actuated to cause the lower end portion of the ejection rail unit to pivot toward the right as viewed in Fig. 2, thus adjusting the seat to suit a crewman of relatively long body and leg length. Reversely, upon opposite action of the screw jack 75, the crosshead 66 will be raised, whereby the seat bucket will be raised on the ejection rails 56—56 while at the same time the bell cranks 84—84 are actuated so as to force the lower end portion of the ejection rail unit to swing toward the left as viewed in Fig. 2, thereby adjusting the seat bucket to suit a crewman of shorter body and leg length.

As noted hereinabove, such adjustments of the seat operate automatically to synchronize fore-and-aft swinging movements of the ejection rail unit with up and down sliding movements of the seat bucket on the rail unit, thereby moving the crewman's body reference point diagonally whereby crewmen of different body and leg lengths may be readily accommodated so as to be seated within convenient leg reach of the aircraft rudder pedals or the like, while the elevational level and fore-and-aft position of the occupant's eyes are maintained substantially constant. Thus, if the seat of the invention is employed for example as a combat aircraft pilot seat, the seat will be readily adjustable to suit pilots of different body and leg lengths in such manner that simple actuation of the jack 75 will operate to adjust the seat to proper leg length from the aircraft control pedals while the pilot's eye is at all times maintained substantially at the same elevation and at the same fore-and-aft position relative to gun sight or other control instruments or the like.

As explained hereinabove in connection with Fig. 1, the cylinder portion 68 of the catapult device is firmly mounted in the crosshead 66, and consequently upon firing of the catapult the thrust arm 70 thereof ejects from the cylinder 68 and drives the bucket seat 50 to catapult upwardly in line with the rails 56—56. It is of course possible to design the various components of the mechanism so that forces of the catapult firing operation reacting against the crosshead 66 may be successfully withstood by the seat adjustment control and jack mechanism 75, so that the ejection operation may be accomplished with the seat in any adjusted position.

In some installations, the arrangement of the controls or instrument board of the aircraft may be of such location that the pilot's knees or feet might strike them during ejection from the upward and forward adjusted positions of the seat. In this case, it would be necessary to return the seat to the bottomed and most aft position before the ejection catapult is fired. For this purpose, as shown in more detail in Figs. 3–4, a bottoming cylinder 92 may be connected as indicated at 93 to the top cross bar 60 while the thrust output member 94 thereof is connected by means of a bell crank 95 to the clevis pin 96 of the pivot connection 76 between the crosshead and the elevation control jack 75. The cylinder 92 is arranged to be normally free stroking, but when energized by means of any suitable manually controlled device (not shown) the thrust output member 94 thereof drives downwardly so as to rotate the bell crank 95 to withdraw the pin 96 from the jack connection to the crosshead. Thus, it will be appreciated that the control device for the cylinder 92 may be readily interconnected with the seat ejection preliminary control system so that the jack 75 will be disconnected from the crosshead just prior to firing of the catapult. Stops 98—98 (Fig. 3) are preferably provided on the slide rails 56—56 so as to limit the downward movement of the crosshead on the rails when the crosshead is disconnected from the elevation control device. Thus, the fixed stops 98—98 assume the catapult reaction forces and limit the crosshead downward travel. A stop 99 is provided to receive the bottoming cylinder thrust after the pin 96 is pulled. It will be understood that the desired effect of the bottoming operation may be introduced automatically during the ejection process without the addition of cylinder 92 and crank 95. The geometry of the overall linkage is such that the tension load applied to actuator 78 as a reaction to the ejection process is much larger than any other tensile loads applied to this member during normal operation or in the event of a crash. It is therefore possible to incorporate in the actuator 78 structure a relatively weak tensile link which will carry all incidental loads except that due to ejection. Therefore, after the firing of the catapult, this actuator will rupture, allowing the reaction of the catapult 68 to drive the crosshead 66 down into contact with stops 98. This will have the effect of returning the rails 56—56 to their most rearward position at some stage of the catapult stroke and will provide the necessary fore-and-aft clearance for the ejected crewman.

As shown in Fig. 2, foot trays 100 may be provided ahead of the seat bucket to support the occupant's feet during the jettison operation. Such trays are conveniently carried at the forward ends of struts 102 which in turn pivotally connect as at 103 to the seat bucket. Normally the trays 100 are permitted to rest against the aircraft floor surface and because of the pivotal connections 103 the trays will slide freely to and fro during adjustments of the seat to different occupants. However, to provide the required foot support during a jettisoning operation latches 104 are provided on the seat bucket 50 for engagement with lugs 105 extending from the trays upon operation of the preliminaray control for the jettisoning operation; the latches 104 being normally spring-biased by means of the spring 104' to inactive position as shown. It will of course be understood that appropriate seat action controls and accessories will also be employed, such as for example arm rest devices as indicated at 108 carried by uprights 109 based upon the seat structure, as may be preferred.

Fig. 5 illustrates in rear perspective a seat construction generally along the lines of the arrangement of Figs. 1 and 2, but differing somewhat therefrom in respect to constructional details. In Fig. 5 the seat bucket 110 mounts integrally thereon rollers 112 at opposite sides of the seat, which run in channel sectioned rails 114—114. Brackets 115—115 extend from the respective upper ends of the rails 114—114 for respective pivotal connections at points 116—116 with fixed structure of the mounting aircraft. At their lower ends the rails 114—114 are interconnected by a cross shaft 117 which is journaled at its opposite ends for free rotation within the lower ends of the rails 114—114. Crank arms 118—118 extend rigidly downwardly from the shaft 117 into pivotal connections at 119 with corresponding links 120—120 which in turn extend into pivotal connections as indicated at 121—121 with stationary structural portions of the mounting aircraft such as the cabin floor panel or the like. The cross shaft 117 is also fitted with a laterally extending crank arm 122 to which is pivotally connected the lower end of a push-pull member 123, the upper end of which pivotally connects to a cross head 124 which slidably engages at its opposite ends upon the rails 114—114 for vertical sliding movements thereon.

The cross head 124 mounts by means of a pivotal connection device the emergency catapult cylinder 125, the piston or thrust member 126 of which pivotally connects as indicated at 127 to an integral bracket portion of the seat bucket member 110. The piston member 126 is of course normally bottomed in the cylinder 125, and thus it will be appreciated that the vertical position of the cross head 124 on the rails 114—114 will determine the vertical position of the seat bucket 110 relative to its mounting structure. A cross bar 128 extending rigidly between the upper ends of the rails 114—114 is provided with a yoke device pivotally connected as indicated at 129 to one end of a suitable jack device 130; the other end of which in turn pivotally connects to the cross head 124. Hence, it will be understood that whenever the jack device 130 is energized to either increase or decrease the effective length thereof this will result in corresponding raisings or lowerings of the cross head 124 accompanied by similar elevational adjustments of the seat bucket 110. Also, coincident with such movements the tie rod 123 will operate to crank the lower shaft 117 either clockwise or counterclockwise, which will result in swinging the lower end of the rail assembly 114—114 either to the right or to the left as viewed in Fig. 5.

Thus, as explained hereinabove in connection for example with the construction shown in Fig. 1, when the adjustment jack 130 is energized to increase its effective length, the seat bucket 110 will be lowered on the rail unit while at the same time the bottom end of the rail unit is swung rearwardly; while when the jack 130 is energized to decrease in length the seat bucket 110 will be raised while being simultaneously moved forwardly, thereby permitting the seat to be readily adjusted to suit differently dimensioned crewmen. However, under all conditions of seat adjustment, the unit is in position for emergency catapulting of the seat and its occupant, through operation of the catapult cylinder 125, through a jettison hatchway of minimum size in the ceiling portion of the aircraft structure.

Figure 6:
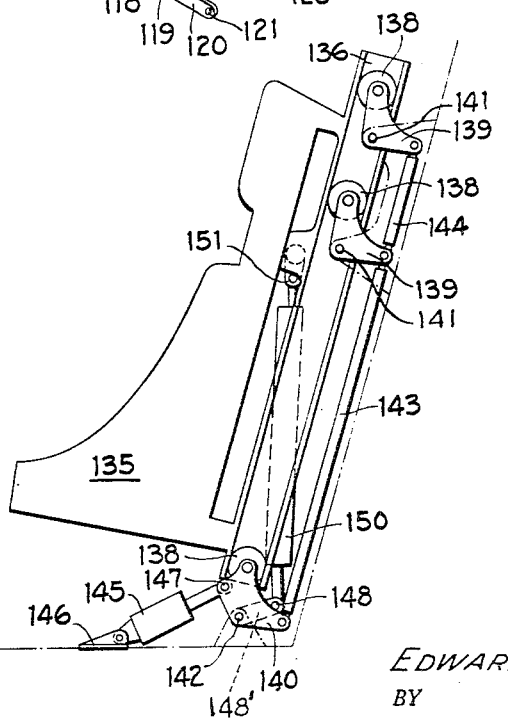
Fig. 6 is a view like Fig. 1 but of a modified structural arrangement.

Fig. 6 illustrates in side elevation somewhat schematically a modified form of the seat construction wherein the seat bucket is indicated at 135 as having formed integrally therewith side rail devices 136 which are of channel section form as in the case of the side rails 114—114 of Fig. 5. However, in the case of Fig. 6 the seat support rollers 138 are mounted upon upper bell cranks 139—139 and lower bell cranks 140—140; all of which are fulcrumed upon bracket devices extending from fixed structure of the aircraft as indicated at 141, 142. The bell cranks 140 and 139—139 are interconnected by push-pull members 143—144 so that pivoting movements thereof on their respective fulcrums are at all times synchronized, and a jack device 145 is connected at one end to a floor bracket 146 or the like and at its other end by means of a pivotal connection 147 to the bell crank 140 so that length adjustments of the jack 145 will result in corresponding pivoting movements of the bell cranks 140—139—139 in synchronism.

Pivotally connected to the lower bell crank 140 as indicated at 148 by means of a crank arm 148' which is fixed to extend laterally from a cross shaft connecting opposed bell cranks 140 and providing the aforesaid fulcrum 142, is one end of the emergency catapult cylinder-piston unit 150; the other end of which pivotally connects as indicated at 151 to the seat bucket 135. Thus, inasmuch as the catapult cylinder-piston unit is normally in contracted or bottomed position, the position of the bell crank 140 will regulate the vertical position of the seat bucket 135; and length adjustments of the jack 145 will result in coincident raising or lowerings of the seat bucket and lateral displacements of the entire unit toward the left or toward the right, as viewed in Fig. 6. For example, to suit the seat to a relatively short-bodied and short-legged crew man, the jack 145 will be energized so as to decrease its effective length whereupon the bell cranks 139—140 will be caused to rotate upon their fulcrums in counterclockwise direction. This operation will cause the entire seat unit to be displaced toward the left as viewed in Fig. 6 but at the same time the catapult device 150 will be displaced vertically so as to cause the seat bucket 135 to rise relative to the rollers 138. Similarly, reverse operation of the jack 145 will cause the seat to simultaneously lower on the rollers 138 and to be swung toward the right as viewed in Fig. 6 so as to accommodate longer-bodied and longer-legged crewmen. However, at any stage of seat adjustment, the catapult device 150 may be fired so as to cause the seat bucket 135 to be driven vertically on the rollers 138 for emergency jettisoning purposes as explained hereinabove.

Fig. 7 illustrates another arrangement of the invention wherein the seat bucket is illustrated at 155 as carrying integrally therewith rollers 156 running in channel sectioned rails 157—157 at opposite sides of the seat bucket. The rails are interconnected at their upper ends by means of laterally extending brackets and a cross bar device as indicated at 158, and adjacent their lower ends by means of a cross shaft 159 which is journaled as indicated at 160 in the respective side rails 157—157. Bell cranks 161—161 are keyed to the bottom shaft 159 and are fulcrumed as indicated at 162—162 upon suitable brackets fixed to stationary structure of the aircraft (not shown). The bell cranks 161—161 are in turn pivotally connected as indicated at 163 to the lower ends of corresponding push-pull members 164—164 which extend upwardly into pivotal connections as indicated at 165 with bell crank devices 166—166 which are fixed to a countershaft 167 extending transversely of the mid-portions of the rails 157—157 and journaled thereon as indicated at 168. The countershaft 167 is in turn controlled by a crank arm 169 which connects to one end of a length-adjustable jack device 170, the other end of which pivotally connects as indicated at 171 to the top cross bar 158. The bell cranks 166—166 also pivotally connect as indicated at 172 with links 173—173 extending into pivotal connections with brackets 174 which are fixed to stationary structure of the aircraft (not shown).

Thus, it will be appreciated that length adjustments of the jack device 170 will result in either clockwise or counterclockwise rotations of the counter shaft 167 which will cause the upper bell cranks 166—166 to rock upon their fulcrum pivots 172—172 so as to throw the upper end of the rail structure either toward the left or toward the right while at the same time the lower bell cranks 161—161 are being actuated to throw the lower end of the rail unit in similar direction. The bottom cross shaft 159 is also fitted with a rigidly extending crank device 176 which pivotally connects to the lower end of the catapult cylinder-piston unit 178, the upper end of which pivotally connects as indicated at 179 to the seat bucket 155. Inasmuch as the catapult device 178 is normally in its contracted or bottomed position, the catapult device comprises a supporting link between the seat bucket and the crank and lever system which is controlled by the jack device 170, so that whenever the jack device is energized for example to increase in length, the seat will be simultaneously raised on the rails 157—157 and moved forwardly so as to adapt the seat to fit a crewman of relatively small dimensions. Then when the jack device 170 is energized to decrease in length the seat will be lowered and displaced rearwardly to suit the device to a longer-bodied crewman. In any case, however, the mechanism is in condition to be operated for emergency jettisoning by simply energizing the catapulting device 178, as is well known in the art.

Fig. 8 illustrates another upward ejection type seat of the invention wherein the support rail structure is mounted as in the manner of Fig. 7 relative to the fixed airplane structure, but wherein a different form of catapult mount is employed. In this case the seat bucket is designated 180; the support rollers 181; the guide rails 182—182; and the seat positional adjustment jack device 184. In this instance the adjustment jack 184 is pivotally connected as indicated at 185 to a cross head device 186 which extends between the guide rails 182—182 and slidably embraces the latter at its opposite ends for vertical sliding adjustments thereon. Bell cranks 188—188 are journaled upon the side rails 182—182 as indicated at 189 and are fulcrumed against stationary structure of the aircraft frame by means of link and bracket devices as indicated at 190. In turn the bell cranks 188—188 are connected by means of links 191—191 to the cross head 186 whereby it will be appreciated that raising or lowering of the cross head 186 (responsive to energization of the jack 184) on the rails 182—182 will result in coincident pivoting of the bell crank devices 188—188 on their respective fulcrum devices so as to cause the upper ends of the rails 182—182 to be displaced toward the left or to the right, as the case may be.

The cross head 186 is interconnected by means of a push-pull member 194 to a crank arm 195 extending from a bottom shaft 196 which is journaled at its opposite ends in the bottom end portions of the side rails 182—182. Crank arms 198—198 extend rigidly from the shaft 196 into pivotal connections as indicated at 199 with stationary bracket devices fixed to the air frame; and thus it will be appreciated that length adjustments of the jack device 184 will procure simultaneous fore and aft displacements of the upper and lower end portions of the side rails 182—182 upon which the seat bucket 180 is mounted.

An emergency catapult cylinder-piston unit as indicated at 200 is pivotally connected by means of a yoke device to the ross head 186, and the thrust member thereof pivotally connects as indicated at 202 to the seat bucket 180. Inasmuch as the catapult device is normally in bottomed or contracted condition, it will be appreciated that the latter constitutes a support link between the seat bucket and the cross head, whereby length adjustments of the jack device 184 will result in coincident raising and lowering of the seat bucket on the track rails 182—182 and fore or aft displacements thereof relative to the fixed air frame; while at all times the seat and its occupant may be jettisonned from the rail support unit by operation of the catapult device 200, as explained hereinabove.

Fig. 9 illustrates application of the invention to a downward ejection seat arrangement, as in an aircraft where it is necessary to arrange to emergency-jettison the seat and its occupant through an aperture in the floor of the aircraft instead of through the ceiling thereof as in the applications previously discussed. In the case of Fig. 9 the seat bucket is designated 205, and is shown as mounting integral therewith rollers 206 adjacent the upper and lower ends thereof and at the sides thereof. Channel sectioned support rails 208—208 are provided to receive the rollers 206; and the rails 208—208 are interconnected at their upper ends by means of a cross bar 209. This bar 209 supports a length adjustable jack device 210, the other end of which pivotally connects as indicated at 211 with a crank arm 212 extending rigidly from a countershaft 214 which is journaled at its opposite ends upon the side rails 208—208. Bell cranks 216—216 are fixed to opposite ends of the shaft 214, and in turn are fulcrumed by means of link and bracket devices as indicated at 218 to stationary structure of the air frame. Also, the bell cranks 216—216 pivotally connect to corresponding upper ends of push-pull members 220—220, the lower ends of which pivotally connect to bottom bell cranks 222—222 which are fulcrumed as indicated at 223 upon fixed bracket plates 224—224. The cranks 222—222 also pivotally connect as indicated at 225 to the corresponding lower end portions of the rails 208—208. Thus, it will be appreciated that whenever the jack device 210 is adjusted to either increase or decrease the effective length thereof, the bell crank devices 216—222 will be operated to cause the side rail unit 208—208 to be laterally displaced either toward the right or to the left as viewed in Fig. 9.

The crank 212 extending from the countershaft 214 also pivotally connects at 211 to one end of an emergency catapult cylinder-piston unit as indicated at 226; the lower end of which pivotally connects as indicated at 227 to a bracket carried by a bottom bar 228 which extends between and is fixed to brackets 229 extending rearwardly and integrally with the seat bucket 205. Thus, it will be appreciated that length adjustments of the jack device 210 will result also in bodily displacements in vertical directions of the catapult device 226 with consequent raising or lowering of the seat bucket 205 coincidental with lateral displacements thereof as explained hereinabove. At the same time, the seat bucket is at all times ready to be jettisoned downwardly through a suitable aperture in the bottom of the aircraft upon operation of the catapult device 226.

Fig. 10 illustrates application of the invention to an aircraft crewman's seat arranged to be diagonally adjustable to suit the seat to differently-sized crewmen and at the same time readily jettisonable downwardly through an aperture in the bottom of the aircraft; the supporting rail structure being pivotally mounted adjacent its upper end to fixed air frame structure as distinguished from the mounting arrangements just previously described. In this case the seat bucket is designated 230 and is shown as carrying integrally therewith support rollers 232 which run within channel sectioned ride rails 234—234. At their upper ends the side rails are interconnected by means of a cross bar 236, and brackets 238—238 are provided for pivotal connection thereof to the fixed air frame structure. Adjacent their lower ends the rails 234—234 are provided with bell cranks 240—240 which are pivotally connected to the side rails as indicated at 241.

The bell cranks 240—240 are each fulcrumed by means of a link 242 against fixed structure of the air frame (not shown), and the bell cranks also pivotally connected as indicated at 243 to the lower ends of push-pull members 244—244, the upper ends of which pivotally connect to crank arms 245 extending rigidly from a countershaft 246 which is journaled at its opposite ends upon the side rails 234—234. The countershaft 246 carries a crank arm 248 which extends rigidly therefrom into pivotal connections with the bottom end of a length adjustable jack device 250 and with the upper end of an emergency catapult cylinder-piston unit 252. The upper end of the jack device 250 is pivotally connected to a bracket 254 which is carried by the top cross bar 236, while the lower end of the catapult device 252 connects to a bracket 256 carried by a cross bar 258 which extends between bracket portions 259—259 extending integrally from the seat bucket 230.

Thus, it will be appreciated that the jack device 250 and the catapult device 252 cooperate to provide vertical support for the seat bucket 230 on the roller rails 234—234; the vertical position of the seat bucket at any time being determined by the adjustment of the jack 250. However, at any time the seat bucket and its occupant are readily ejectable for emergency jettisoning purposes, downwardly relative to the rail structure 234—234 by simple operation of the catapult device 252, as is well known in the art. However, to adapt the seat to suit variously-sized crewmen, the jack 250 need only be energized to either increase or decrease the effective length thereof whereby the seat bucket 230 will be either lowered or raised on side rails 234, and will be coincidentally displaced either forwardly or rearwardly adjacent the lower end thereof by operation of the countershaft 246 and the bell crank devices 240—240. Thus, as explained hereinabove the seat is readily adjustable in a diagonal yet substantially straight line direction to suit the seat to differently sized crewmen, while at the same time it is always readily jettisonable by simple operation of the catapult device regardless of the adjusted position of the seat.

Whereas, I have shown power operated jack devices in the drawing for adjusting the position of the seat on the support rail unit, it will be appreciated that the seat may be manually displaced and latched in position or otherwise adjusted to suit different crewmen; and that whereas only a few forms of the invention have been shown and described in detail, it will be apparent to those skilled in the art that the invention is not so limited that various changes may be made therein without departing from the spirit of the invention or the scope of the appended claims.

What is claimed is:

1. An aircraft catapult seat comprising, in combination, a trackway unit pivotally suspended in the aircraft adjacent a jettison hatchway in the upper portion of the aircraft, a passenger seat mounted upon said trackway for movement therealong for adjustments to suit different occupants, lever means actuated automatically in connection with movements of said seat relative to said trackway and operable to cause said trackway unit to pivot incidental to movements of said seat therealong, and seat catapult means carried by said trackway and coupled to said seat and operable to drive the latter to be jettisoned along said trackway through said hatchway.

2. An upward ejection seat for aircraft comprising track means pivotally mounted adjacent its upper end in the aircraft, a passenger seat mounted upon said track means for movement therealong, means coupling said seat at adjusted positions relative to said track means for passenger adjustment purposes, pivot control means actuated automatically incidental to movements of said seat relative to said track means, said pivot control means being operable to cause said track means to pivot incidental to movements of said seat therealong, and seat catapult means carried by said track means and coupled to said seat and operable to drive the latter to be jettisoned along said track means.

3. An upward ejection seat for aircraft comprising in combination a trackway unit pivotally suspended from the upper end thereof in the aircraft adjacent an ejection hatchway in the aircraft, a passenger seat mounted upon said trackway for movement therealong, a power device coupled to said seat for causing the latter to move relative to said trackway for passenger adjustment purposes, lever means actuated simultaneously by said power means to cause said trackway unit to pivot incidental to movements of said seat therealong, and seat ejection means coupled to said seat and operable to eject the latter along said trackway and through said hatchway.

4. An aircraft upward ejection catapult seat comprising, in combination, a trackway unit pivotally suspended in the aircraft, a passenger seat mounted upon said trackway for vertical movement therealong, a cross head slidable on said trackway, a jack device coupled to said cross head for causing the latter to move along said track unit, lever means interconnecting said cross head and said trackway and actuated automatically to cause said trackway unit to pivot incidental to movements of said cross head therealong, and seat catapult means carried by said cross head and coupled to said seat and operable to drive the latter to be jettisoned upwardly along said trackway.

5. An upward ejection seat for aircraft comprising track means pivotally mounted adjacent its upper end in the aircraft, a passenger seat mounted upon said track means for movement therealong, a cross head slidable on said track means, pivot control means actuated automatically incidental to movements of said cross head relative to said track means, said pivot control means being operable to cause said track means to pivot incidental to movements of said cross head therealong, and seat catapult means carried by said cross head and coupled to said seat and operable to drive the latter to be jettisoned along said track means.

6. An upward ejection seat for aircraft comprising track means pivotally mounted adjacent its upper end in the aircraft, a passenger seat mounted upon said track means for movement therealong, pivot control means actuated automatically incidental to movements of said seat relative to said track means, said pivot control means being operable to cause the lower end of said track means to swing in fore-and-aft directions incidental to movements of said seat vertically therealong, and seat catapult means carried by said track means and coupled to said seat and operable to drive the latter to be jettisoned along said track means.

7. An upward ejection seat for aircraft comprising track means pivotally mounted adjacent its upper end in the aircraft, a passenger seat mounted upon said track means for movement therealong, power means coupled to said seat for causing the latter to move relative to said track means for passenger adjustment purposes, pivot control means actuated automatically incidental to movements of said seat relative to said track means, said pivot control means being operable to cause the lower end of said track means to swing in fore-and-aft directions incidental to movements of said seat vertically therealong, seat catapult means carried by said track means and coupled to said seat and operable to drive the latter to be jettisoned along said track means, and release means operable to release said power means from connection with said seat preliminary to ejection of said seat.

8. An aircraft upward ejection catapult seat comprising, in combination, a trackway unit pivotally suspended in the aircraft, a passenger seat mounted upon said trackway for vertical movement therealong, a cross head slidable on said trackway, a jack device coupled to said cross head for causing the latter to move along said track unit, lever means interconnecting said cross head and said trackway and fixed structure of the aircraft and actuated automatically to cause said trackway unit to pivot incidental to movements of said cross head therealong, and seat catapult means carried by said cross head and coupled to said seat and operable to drive the latter to be jettisoned upwardly along said trackway.

9. An upward ejection seat for aircraft comprising in combination a trackway unit pivotally suspended from the upper end thereof in the aircraft adjacent an ejection hatchway in the aircraft, a passenger seat mounted upon said trackway for movement therealong, a power device coupled to said seat for causing the latter to move relative to said trackway for passenger adjustment purposes, lever means interconnecting said seat and said trackway and fixed structure of the aircraft and actuated by said power means to cause said trackway unit to pivot incidental to vertical movements of said seat therealong, and seat ejection means coupled to said seat and operable to eject the latter along said trackway and through said hatchway.

10. An upward ejection seat for aircraft comprising track means pivotally mounted adjacent its upper end in the aircraft, a passenger seat mounted upon said track means for movement therealong, means coupled to said seat for holding the latter at different adjusted positions relative to said track means for passenger adjustment purposes, pivot control means actuated automatically incidental to movements of said seat relative to said track means, said pivot control means being operable to cause the lower end of said track means to swing in fore-and-aft directions incidental to movemetns of said seat vertically therealong, seat catapult means carried by said track means and coupled to said seat and operable to drive the latter to be jettisoned along said track means, a passenger foot support pivotally connected to said seat and normally free to slide on the aircraft floor incidental to passenger adjustments of said seat, and latch means controllable to lock said foot support to said seat for ejection purposes.

11. An aircraft catapult seat comprising in combination, a trackway unit pivotally suspended in the aircraft adjacent a jettison hatchway in the aircraft, a passenger seat mounted upon said trackway for movement therealong, means coupled to said seat for holding the latter at different positions relative to said track unit for adjustments to suit different occupants, means actuated automatically in connection with movements of said seat relative to said trackway and operable to cause said trackway unit to pivot incidental to movements of said seat therealong, and seat catapult means carried by said trackway and coupled to said seat and operable to drive the latter to be jettisoned along said trackway through said hatchway.

12. An ejection seat for aircraft comprising track means pivotally mounted in the aircraft, a passenger seat mounted upon said track means for movement therealong, means coupled to said seat for locating the latter relative to said track means for passenger adjustment purposes, pivot control means actuated automatically incidental to movements of said seat relative to said track means, said pivot control means being operable to cause said track means to pivot incidental to movements of said seat therealong, and seat catapult means carried by said track means and coupled to said seat and operable to drive the latter to be jettisoned along said track means.

13. A downward ejection seat for aircraft comprising in combination a trackway unit pivotally suspended in the aircraft adjacent an ejection hatchway in the aircraft, a passenger seat mounted upon said trackway for movement therealong, an adjustment device coupled to said seat for locating the latter relative to said trackway for passenger adjustment purposes, means actuated simultaneously by said adjustment means to cause said trackway unit to move forwardly or rearwardly incidental to movements of said seat therealong, and seat ejection means coupled to said seat and operable to eject the latter along said trackway and through said hatchway.

14. An ejection seat for aircraft comprising track means movably mounted in the aircraft, a passenger seat mounted upon said track means for movement therealong, adjustment means coupled to said seat for locating the latter relative to said track means for passenger adjustment purposes, control means actuated automatically incidental to movements of said seat relative to said track means being operable to cause said track means to swing in fore-and-aft directions incidental to movements of said seat vertically therealong, and seat catapult means carried by said track means and coupled to said seat and operable to drive the latter to be jettisoned along said track means.

References Cited in the file of this patent

UNITED STATES PATENTS

| Number | Name | Date |
|---|---|---|
| 1,882,315 | Clayton | Oct. 11, 1932 |
| 2,467,763 | Martin | Apr. 19, 1949 |
| 2,516,902 | Musser | Aug. 1, 1950 |
| 2,536,086 | Pomykala | Jan. 2, 1951 |